US007825855B1

(12) United States Patent
Nicholson

(10) Patent No.: US 7,825,855 B1
(45) Date of Patent: Nov. 2, 2010

(54) ASSISTED GLOBAL POSITIONING SYSTEM LOCATION DETERMINATION

(75) Inventor: Peter Nicholson, Bulli (AU)

(73) Assignee: Andrew LLC, Hickory, NC (US)

(*) Notice: Subject to any disclaimer, the term of this patent is extended or adjusted under 35 U.S.C. 154(b) by 1471 days.

(21) Appl. No.: 10/783,434

(22) Filed: Feb. 20, 2004

(51) Int. Cl.
*G01S 19/06* (2010.01)
(52) U.S. Cl. .............................. 342/357.43
(58) Field of Classification Search ............ 342/357.15, 342/357.43
See application file for complete search history.

(56) References Cited

U.S. PATENT DOCUMENTS

| | | | | |
|---|---|---|---|---|
| 4,949,268 | A | * | 8/1990 | Nishikawa et al. .......... 701/216 |
| 5,323,163 | A | * | 6/1994 | Maki ..................... 342/357.15 |
| 6,650,288 | B1 | * | 11/2003 | Pitt et al. ............... 342/357.15 |
| 6,720,915 | B2 | * | 4/2004 | Sheynblat ............... 342/357.05 |
| 2005/0068229 | A1 | * | 3/2005 | Moilanen et al. ........ 342/357.15 |

FOREIGN PATENT DOCUMENTS

EP  874248 A2 * 10/1998

* cited by examiner

*Primary Examiner*—Gregory C Issing
(74) *Attorney, Agent, or Firm*—Duane Morris LLP

(57) ABSTRACT

The present invention relates to a method for selectively reducing the amount of assistance data transmitted to an assisted GPS equipped mobile terminal by excluding the transmission of assistance data relating to one or more satellites that are potentially visible to the mobile station. In the preferred embodiment one or more criteria are used to identify which of the potentially visible satellite are the least likely to be used by the mobile terminal in determining its position, and assistance data relating to the least likely satellites to be used is excluded from the assistance data that is to be transmitted to the mobile terminal. A determination of an optimal number of satellites for which assistance data should be sent to the mobile terminal.

4 Claims, 3 Drawing Sheets

ASSISTED GLOBAL POSITIONING SYSTEM LOCATION DETERMINATION

FIELD OF THE INVENTION

The present invention relates to improvements in location determination by assisted global positioning system (GPS) equipped terminals of a wireless network.

BACKGROUND OF THE INVENTION

Assisted GPS has emerged as a strong candidate for providing accurate location determination to mobile terminals operating in wireless telecommunications networks. Assisted GPS equipped mobile terminals have an associated GPS receiver (or partial GPS receiver) and rely on the wireless communications network to communicate so called "assistance data" to the mobile station.

The assistance data enables the terminal to improve, inter alia, positioning sensitivity, signal acquisition time, accuracy, and battery consumption without requiring additional hardware.

One of the key advantages of assisted GPS over conventional GPS receivers is the reduced time to first fix realised by assisted GPS receivers. However, particularly for emergency calls (e.g. E911 and E112) it is desirable that this time be further reduced.

SUMMARY OF THE INVENTION

The present invention is based on the inventor's insight that the time to first fix can be reduced if the amount of assistance data that needs to be downloaded by an assisted GPS mobile terminal can be reduced. Thus in broad concept the present invention provides a method for selectively reducing the amount of assistance data transmitted to an assisted GPS equipped mobile terminal by excluding the transmission or assistance data relating to one or more satellites that are potentially visible to the mobile station. In the preferred embodiment assistance data relating only to those satellites in the GPS constellation, which are most likely to be used by the mobile handset to determine its location, are transmitted to the mobile terminal.

In a first aspect the present invention provides a method for compiling assistance data for transmission to a mobile terminal of a wireless communications network said terminal having an associated satellite positioning system receiver. The method includes, determining which satellites of a satellite positioning system constellation are potentially visible to the mobile terminal, then determining on the basis of at least one predetermined criterion the likelihood that each of the potentially visible satellites will be used by the mobile terminal when determining its position. The method then includes selecting a plurality of satellites from the potentially visible satellites having the greatest likelihood that the mobile terminal will use that satellite when determining its position and compiling assistance data for transmission to the mobile terminal for the selected satellites.

BRIEF DESCRIPTION OF THE DRAWINGS

The present invention will now be described by way of non-limiting example only with reference to the accompanying drawings in which.

DETAILED DESCRIPTION OF THE EMBODIMENTS

A preferred embodiment of the present invention provides a method which can be used for selectively reducing the amount of assistance data which needs to be sent to a mobile handset of a telecommunications network when determining its positron with its associated assisted GPS receiver.

In normal operation assistance data for all potentially visible satellite are sent to an assisted GPS equipped mobile terminal to allow it to determine its location. The preferred embodiment of the method uses one or more criteria to identify which of the potentially visible satellite are the least likely to be used by the mobile terminal in determining its position, and assistance data relating to the least likely satellites to be used is excluded from the assistance data that is transmitted to the mobile terminal. In the embodiment described a determination of the number of satellites for which assistance data should be sent to the mobile terminal can be made.

Figure 1:
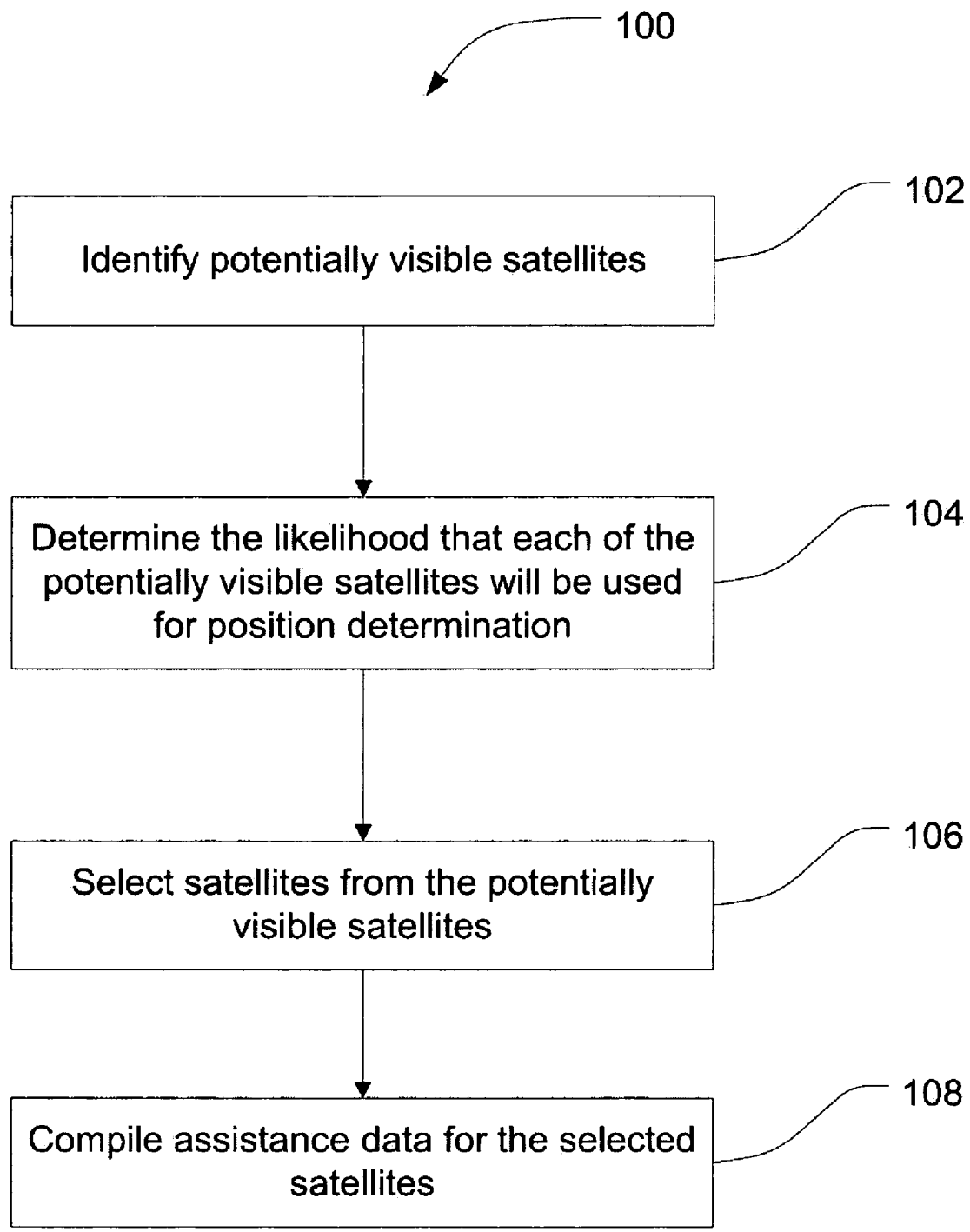
FIG. 1 shows a flowchart depicting the steps in a method according to an embodiment of the present invention.

FIG. 1 shows a flowchart depicting the steps of a method in accordance with an embodiment of the present invention. The method 100 begins by identifying the potentially visible satellites for which assistance data may be required by the mobile terminal when determining its position (Step 102). The potentially visible satellites are the satellites that are above the horizon and should theoretically have a line of sight transmission path to the mobile terminal. However due to man made features or elevated natural terrain these satellites may not be visible to the mobile terminal above the actual horizon.

In the next step 104 the number of satellites for which assistance data should be sent to the mobile terminal is determined, and a preference level is assigned to each satellite on the basis of the likelihood that each satellite will be used by the mobile terminal in determining its position and/or on the basis of the quality of the position determination that is possible using each satellite.

In determining the satellites for which assistance data should be sent to the mobile terminal, one or more factors may be considered, including the following:

the angle of the elevation from the mobile terminal to each of the potentially visible satellites, an elevation model representing the topographical features of the area surrounding the mobile terminal;

the geometrical spread of the potentially visible satellites, the general type of terrain likely to be encountered in the vicinity of the mobile terminal; and historical data relating to the likelihood of the successful acquisition of satellite signals by the mobile terminal when performing its GPS location.

On the basis of one or more of the above factors a subset of the potentially visible satellites is selected in step 106, and in step 108, assistance data is compiled for the selected satellites for transmission to the mobile terminal.

Figure 2:
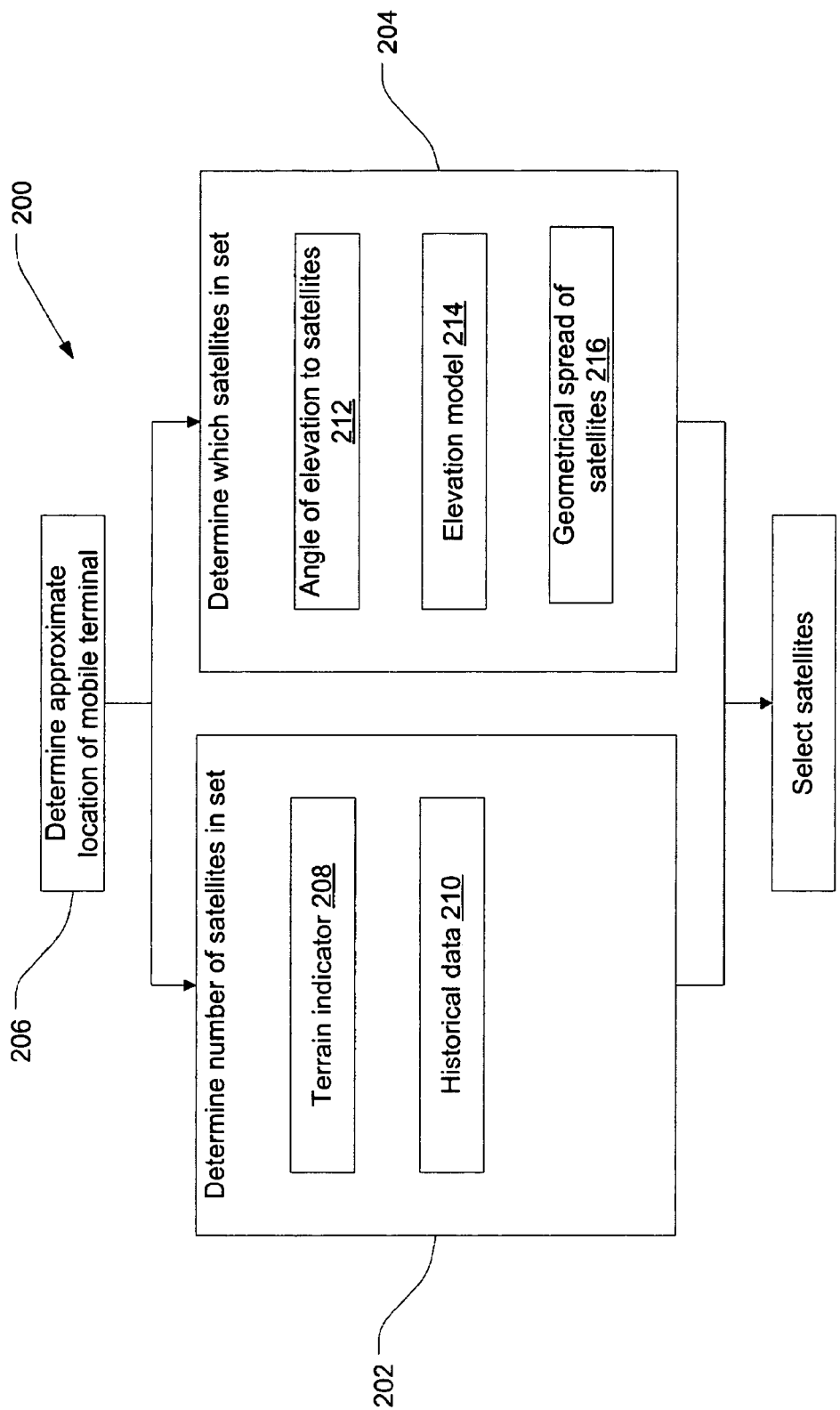
FIG. 2 shows a heuristic diagram depicting criteria which may be used to select satellites for which assistance data will be sent to the mobile handset.

FIG. 2 shows an heuristic diagram 200 illustrating how the above criteria may be used to select satellites for which assistance data will be sent to a mobile handset.

In the diagram 200 the criteria have been grouped into two broad classes, namely criteria used to determine the number of potentially visible satellites that should be in the set of satellites for which assistance data will be sent to the mobile terminal 202, and criteria that may be used to determine which satellites should be included in the set 204.

Depending upon the type of assistance data to be sent, it will typically be necessary to determine the approximate position of the mobile terminal. The collection of this prerequisite data is indicated in the diagram at 206. The more accurate this preliminary location determination is, the more confidently the level of assistance data needed can be determined. However, in the preferred embodiment the time taken in determining the approximate location of the mobile terminal should be minimised in order to allow a quicker time to first fix for the GPS receiver, thus overly complicated methods of determining the approximate location of mobile terminal are best avoided.

Suitable methods of determining the approximate location of the mobile terminal include, but are not limited to cell ID, timing advance or signal strength. In wideband CDMA networks "round trip time" (RTT) can also be used.

In most cases it is sufficient to ascertain which cell of the network the mobile terminal is located in, or if timing advance or signal strength is used it may be possible to determine in which part of a cell the mobile terminal located.

Once this preliminary location determination is performed consideration can be given to one or more of the satellite selection criteria depicted in the heuristic diagram 200. Each of the criteria will now be described in greater detail.

Terrain Indicator—208

For any given geographical location it is possible to assign a terrain indicator which represents the type of terrain in that area. For example, a location may be characterised as having a mountainous terrain or a flat terrain, or even an urban terrain or a rural terrain. Other terrain types can also be devised. It is possible to describe a set of parameters that vary between terrain types that affect the likelihood of successfully obtaining a GPS position fix for a GPS receiver in that terrain. These terrain parameters can be used to determine the minimum number of satellites for which assistance data should be sent to a mobile station for each terrain type.

One of the key parameters to be considered is the likelihood of obstruction of a potentially visible satellite by the terrain, for example if a GPS receiver is located in a valley in mountainous terrain the effective horizon lies at a relatively high angle of elevation and thus it is likely that signals from some potentially visible satellites would be obstructed by the valley sides. Similarly in urban areas where the terrain is characterised by the presence of high-rise buildings it is likely that the full compliment of satellite assistance data will need to be sent to the mobile terminal since it is highly likely that at least one of the potentially visible GPS satellites will be obstructed from view by man made features of the terrain. Conversely in a flat or rural terrain it is less likely that either a man-made or natural features of the terrain will obstruct the transmission path between the potentially visible satellites and the GPS receiver of a mobile terminal. Thus, in flat or rural terrains it can be deemed that assistance data for a subset of potentially visible satellites having less than the total number of potentially visible satellites can be sent to the mobile terminal.

Thus by assigning a terrain type indicator to each cell or geographical area, a decision as to how much assistance data should optimally be sent to a mobile terminal can be made based on its approximate location.

The terrain type indicator for each cell or geographical area can be stored in a data base or look-up table accessible to the location centre of the mobile network.

Historical Data—210

In certain implementations of the present invention a historical database can be created which stores data relating to the number of satellites for which assistance data has been sent to a mobile terminal in a particular location, and whether or not a successful location fix was obtained. Such data can be used to determine a probability of obtaining a successful location fix for the mobile terminal if a assistance relating to a given number of satellites is to be sent.

Using the historical data, a determination can be made based on the approximate position of the mobile terminal whether it is safe or not to exclude satellites from the assistance data to be sent. For example, in regions where GPS location frequently fails the assistance data transmitted to the mobile terminal will include assistance data for all satellites, whereas in areas where GPS location determination works reliably with assistance data for a set of satellites with a reduced number, assistance data for only a subset of the satellites can be transmitted to the mobile terminal.

A weighting can be applied to the historical, data to increase or decrease the relative importance of certain types of historical data. For example weightings can be applied to increase the importance of recently collected data and decrease the importance of older historical data. By applying a weighting to the historical data, recent changes in a location, such as the erection of buildings or the growth of trees etc. can be accommodated. The weighting of older historical data can be set such that at some predetermined age the data is no longer used.

It is also possible to dynamically or periodically set a new weighting scheme for the historical data. For example the historical data could be analysed to look for sharp changes in the success rate of acquiring satellite signals. Such a change may occur due to the erection of a new building or the launch of a new positioning satellite with a more favourable orbit for a particular location. If a change of this type is identified from the historical data, the weightings applied to the historical data can be changed to effectively disregard all data collected before the change occurred.

As will be appreciated, using historical data of this type provides a feedback loop for the method and effectively calibrates how aggressively satellites are excluded from the set of satellites for which assistance data is to be sent to the mobile terminal.

Angle of Elevation—212

The angle of elevation from a GPS receiver to a GPS satellite is known to have an effect on the accuracy of GPS location determination, for example, signals from satellites that are low on the horizon travel a greater distance through the ionosphere causing errors in location determination using signals from those satellites. Moreover, satellites low on the horizon are the most likely to be obstructed by terrain. Accordingly, when decreasing the number of satellites for which assistance data should be sent to a mobile terminal, satellites having a low elevation angle are prime candidates for exclusion.

Elevation Model—214

An elevation model generally comprises a record of the altitude of the ground surface at different locations in a geographical area. An elevation model can be augmented to include information on man made structures such as buildings.

Thus when the approximate location of the mobile terminal can be ascertained, the elevation angle and direction to each satellite can be calculated. This data can be compared to the elevation model to determine which, if any of the potentially visible satellites are actually obscured by either natural features or man made structures.

In the event that one or more of the potentially visible satellites are obstructed from view assistance data relating to that satellite will not be transmitted to the mobile terminal.

Geometrical Spread of Satellites—216

Position dilution of precision (PDOP) is a mathematical value representing the quality of the geometric spread of the potentially visible GPS satellites in the sky. As will be appreciated by those skilled in the art, if the potentially visible satellites are close together then a poor (high) position dilution of precision value will be obtained. However, if the potentially visible satellite are spread across the four quadrants of the sky then the position dilution of precision will be minimal.

When choosing a set of satellites for which assistance data will be sent to the mobile terminal it can be specified that the set having the lowest PDOP be chosen. For example, if a pair of potentially visible satellites lie close together in the sky, with the rest of the satellites evenly distributed in the sky, and visible to the GPS receiver, then excluding one of the pair of satellites from the set will have minimal impact on the PDOP of the GPS receiver.

As will be appreciated, each of the criteria described above can be used either alone or in combination to determine how much assistance data should be sent to the mobile terminal in order to have a suitably high likelihood that the mobile terminal will be able to obtain a location fix. Moreover, two or more of the above five criteria can be used in a weighted combination to determine those satellites for which assistance data should be sent to a mobile terminal.

Figure 3:
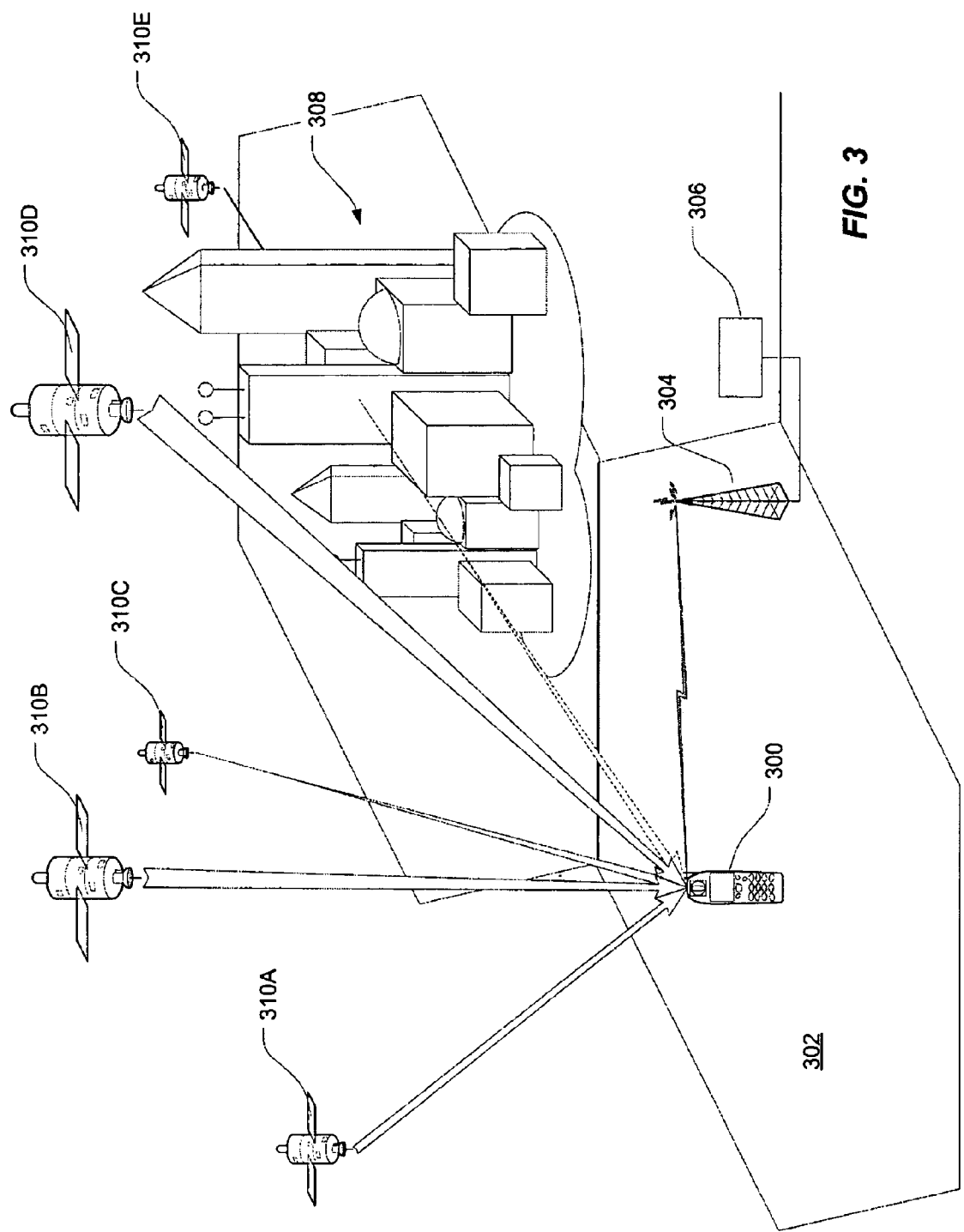
FIG. 3 shows a schematic representation of an exemplary situation in which a method of FIG. 1 may be used advantageously.

An example of a situation in which the present method may be used is depicted in FIG. 3 which shows a mobile terminal 300 operating in a cell 302 of a cellular telecommunication network which is serviced by base station 304. The base station is connected via one or more network elements (not shown) to a mobile location centre (MLC) 306 of the network. The MLC 306 is programmed to use a combination of the above rules to ascertain whether the assisted GPS handset 300 will require assistance data for the full set of satellites or not. If it is determined that a smaller set of assistance data can be sent, whilst maintaining a sufficiently high probability that a successful position fix can be achieved the MLC 306 determines which satellite data to send to the terminal and which to exclude from the assistance data.

The cell 302 has no elevated terrain features and is assigned "flat" as its terrain type. It should also be noted that in a neighbouring cell there is a city 308 that includes a plurality of high rise buildings.

The positions of the potentially visible GPS satellites 310A to 310E are shown on the diagram. The satellites have the following angles of elevation above the horizon when viewed from the mobile terminal 300:

| Satellite | Angle of elevation |
|-----------|--------------------|
| 310A      | 48°                |
| 310B      | 85°                |
| 310C      | 33°                |
| 310D      | 60°                |
| 310E      | 10°                |

As can be seen of the five potentially visible satellites, only four satellites, namely 310A to 310D have an un-obstructed line-of-sight transmission path to the mobile terminal 300. Satellite 310E has its line of sight blocked by the high rise buildings of the city 308.

In use if the mobile terminal 300 attempted to locate its position using its assisted GPS receiver it could not obtain a signal from satellite 310E due to the obstruction caused by the city 308. Accordingly it would be a waste of bandwidth and time to send assistance data relating to satellite 310E to the mobile station 300.

By applying the above heuristic the MLC 306 can decide that it is advantageous to exclude assistance data relating to satellite 310E from the assistance data to be sent to the mobile terminal from the MLC 306.

Based on the criteria described above the factors supporting the exclusion of satellite 310E from the set of satellites for which assistance data will be transmitted to the mobile terminal include:

- The terrain indicator for the cell is "flat" allowing a reduction in the number of satellites for which assistance data is sent.
- Satellite 310E has the lowest elevation angle.
- The satellites are relatively evenly spaced in the sky and the exclusion of satellite 310E would not adversely affect the PDOP for the location determination.
- An elevation model including man-made features would show that signals from satellite 310E are obstructed by the city 308.

It can be seen that considering one or a combination of the above factors an estimation can be made with a relatively high level of confidence that the mobile terminal 300 would not need to (or could not) use satellite 310E when determining its location and thus that it is safe to exclude satellite 310E from the set of satellites for which assistance data is to be sent to the mobile terminal.

As will be appreciated the ability to make an estimation as to which assistance data will be needed allows an optimised (and possibly reduced) amount of assistance data to be sent to an assisted GPS terminal, with the consequential affect that the time taken to download the assistance data by the mobile terminal should be decreased in instances where it is acceptable to transmit a reduced set of assistance data. In these instances the reduction in download time should result in a decreased time to first fix for the assisted GPS receiver.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A method for compiling assistance data for transmission to a mobile terminal of a wireless communications network, said terminal having an associated satellite positioning system receiver, said method including;
   determining which satellites of a satellite positioning system constellation are potentially visible to the mobile terminal;
   determining on the basis of at least one predetermined criterion the likelihood that each of the potentially visible satellites will actually be used by the mobile terminal when determining its position;

selectin a plurality of satellites from the potentially visible satellites having the greatest likelihood that the mobile terminal will use that satellite when determining its position; and compiling assistance data to be transmitted to the mobile terminal for the selected satellites; wherein the likelihood that each of the potentially visible satellites will be used by the mobile terminal when determining its position is determined based, at least in part, on historical data relating to the probability of a mobile terminal achieving a successful location determination when in the geographical area of the mobile terminal.

2. The method of claim 1 in which selecting the plurality of satellites for which assistance data is compiled from the potentially visible satellites, includes determining a likelihood that the mobile terminal will successfully determine its location using its associated satellite positioning system receiver, and determining the number of satellites for which assistance data should be transmitted to the mobile terminal based at least in part on the determined likelihood of successful location determination.

3. The method of claim 2 in which the determined number of satellites includes less than the number of potentially visible satellites.

4. A computer readable medium storing thereon a computer program, said program being configured in use to control the operation of a processor to compile assistance data for transmission to a mobile terminal of a wireless communications network, having an associated satellite positioning system receiver, by performing the steps of:

determining which satellites of a satellite positioning system constellation are potentially visible to the mobile terminal;

determining on the basis of at least one predetermined criterion the likelihood that each of the potentially visible satellites will actually be used by the mobile terminal when determining its position;

selecting a plurality of satellites from the potentially visible satellites having the greatest likelihood that the mobile terminal will use that satellite when determining its position; and compiling assistance data to be transmitted to the mobile terminal for the selected satellites wherein in use the computer program causes the processor to determine an approximate position of the mobile terminal wherein in use the computer program causes the processor to determine the likelihood that each of the potentially visible satellites will be used by the mobile terminal when determining its position based, at least in part, on historical data relating to the probability of a mobile terminal achieving a successful location determination when in the geographical area of the mobile terminal.

* * * * *